March 16, 1926.
L. A. WILSON
POWER TAKE-OFF DEVICE
Filed Dec. 27, 1923
1,576,887
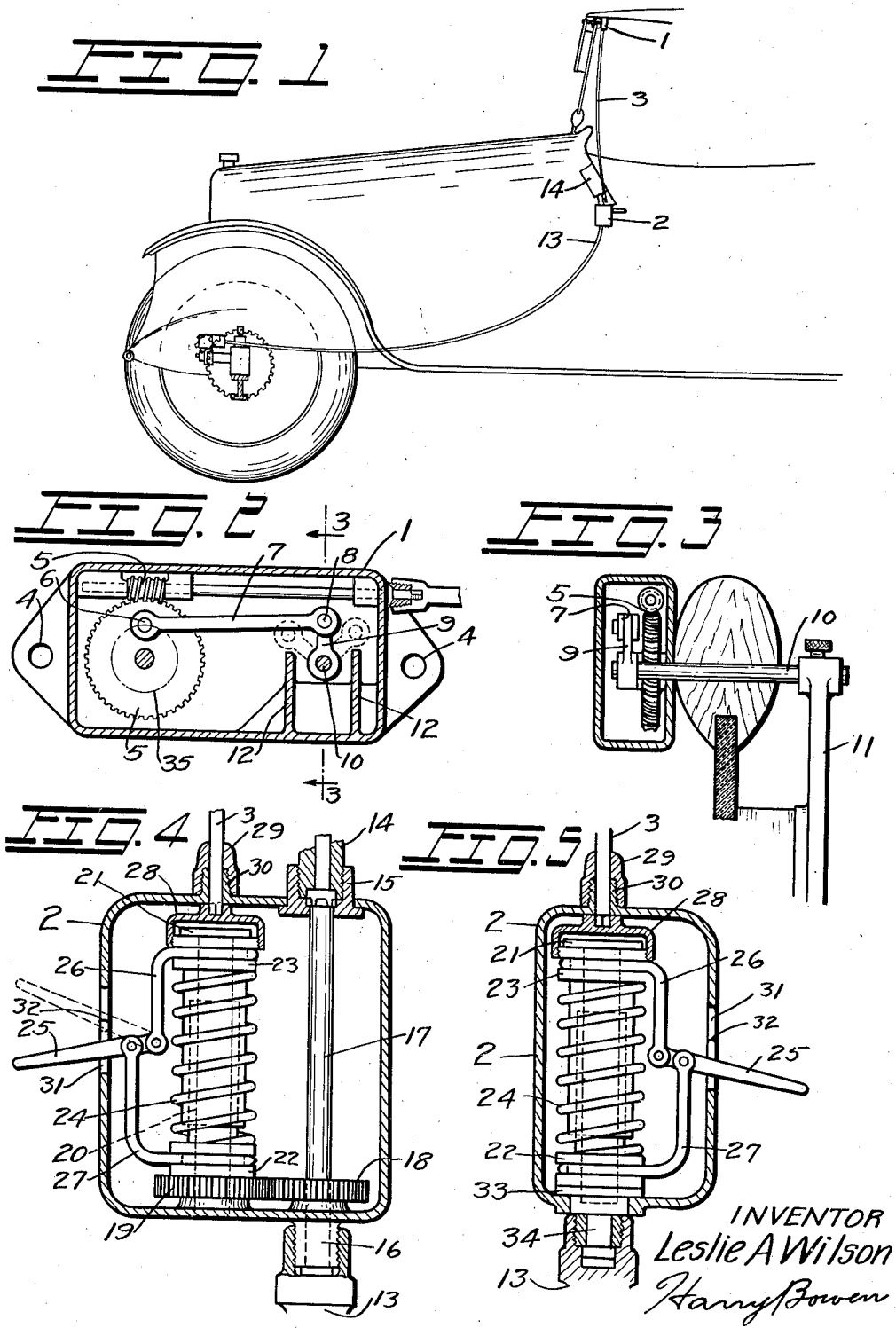
INVENTOR
Leslie A Wilson
Harry Bowen
ATTORNEY Patented Mar. 16, 1926.

1,576,887

UNITED STATES PATENT OFFICE.

LESLIE A. WILSON, OF SEATTLE, WASHINGTON.

POWER-TAKE-OFF DEVICE.

Application filed December 27, 1923. Serial No. 682,900.

*To all whom it may concern:*

Be it known that I, LESLIE A. WILSON, a citizen of the United States, residing at Seattle, county of King, and State of Washington, have invented a new and useful Power-Take-Off Device; and I do hereby declare that the following is a full, clear, and exact specification, such as will enable others skilled in the art to which it appertains to make and use the same.

The invention is a device for cleaning motor vehicle windshields which is operated by an eccentric and a flexible cable which is connected through a take-off box to the speedometer cable, or directly to one of the wheels, the drive-shaft, or part of the engine.

The object of the invention is to provide a device for cleaning the windshields of motor vehicles or the like which will automatically move backward and forward as the vehicle is in motion.

Another object of the invention is to provide a cleaner for motor vehicle windshields or the like which will automatically move backward and forward, in which is a clutch for starting and stopping the cleaner.

And a further object of the invention is to provide an automatic cleaner which is of a simple and economical construction.

With these ends in view the invention embodies a casing having a worm gear and a crank therein, and a shaft extending from the crank through the casing and upper section of the windshield frame so that a wiper may be attached to its outer end. A flexible cable extends from the worm gear to a take-off box that may be inserted between the speedometer and the speedometer cable, and the box may be provided with a clutch for starting or stopping the wiper.

Other features and advantages of the invention will be seen from the following description taken in connection with the drawings, wherein:—

Figure 1 is an elevation showing the location of the device.

Figure 2 is a section through the casing on the wind-shield.

Figure 3 is a cross section on line 3—3 of Figure 2.

Figure 4 is a section through the take-off casing.

Figure 5 is a similar view showing an alternate design in which the flexible cable from the gear case is connected directly to the wheel, drive shaft or engine.

In the drawings I have shown my device as it would be constructed wherein numeral 1 indicates the worm gear casing that is placed upon the windshield, numeral 2 the take-off casing that is inserted between the speedometer cable and the speedometer, and numeral 3 the flexible cable that extends from casing 1 to casing 2.

The casing 1 which may be attached to the upper section of the windshield frame by bolts passing through holes 4 may have a worm gear 5 in it which is connected to the upper end of the flexible cable 3 and which is provided with a pin 6 upon which an arm 7 is pivotally mounted. The opposite end of the arm 7 is pivotally attached through a pin 8 to a crank 9 which is fixedly mounted on a shaft 10 and the shaft 10 extends through the casing and also through the upper section of the windshield frame as shown in Figure 3 so that a swipe 11 which may be of any suitable design may be attached to it and held by a set screw. Webs 12 may be placed on each side of the shaft 10 to limit the downward movement of the arm 9.

The cable 3 extends outward and downward, to the casing 2 which may be installed just below the instrument board and between the speedometer cable 13 and the speedometer 14 as the upper end of the section will be provided with a sleeve 15 that may be screwed over the hub on the lower part of the speedometer and a hub 16 at the lower side similar to the hub on the lower part of the speedometer over which the speedometer cable 13 may be placed. The casing 2 is provided with a shaft 17 which has sockets at each end to engage the sockets of the speedometer and the speedometer cable so that the shaft will turn with the cable and on this shaft is a gear 18 which meshes with a gear 19 that is fixedly mounted on a shaft 20.

The shaft 20 has a head 21 and grooved sleeves 22 and 23 on it which are forced against the head and gear when a spring 24, between them is free. These grooved sleeves have small sleeves projecting from them which telescope within each other, when the spring is compressed. The spring is compressed by a lever 25 through yokes 26 and 27 which engage the grooves in the sleeves 22 and 23, as when the lever 25 is moved from the position shown in full lines to that shown in dotted lines in Figure 4 it will draw the sleeves 22 and 23 together, and thereby release the sleeves so that they will not engage the top of the shaft and gear and therefore, will not rotate with it. A cap is attached to the upper side of the sleeve 23 and the cap is provided with a socket 28 into which the end of the shaft 3 may project so that it will rotate with it. The shaft 3 is provided with a nut 29 which may be screwed over a boss 30 on the upper side of the casing to hold it.

The lever 25 projects through an opening 31 in the side of the casing and is held in the dotted position by placing it over a lug 32.

In the design shown in Figure 5 the shaft 17 is omitted and the cable 13 is directly connected to the lower end of the casing 2 so that it will cause a collar 33 to rotate when the vehicle or engine is in motion. The collar 33 will engage the lower side of the collar 22 in a manner similar to that of the gear 19 and will be provided with a projection 34 at its lower end to engage the socket in the cable 13.

It will also be seen that the cable 13 may be connected to the front wheel or drive shaft of a motor vehicle in a manner similar to that of a speedometer cable, and also to any suitable point on the engine.

It is understood that other changes may be made in the construction without departing from the spirit of the invention. One of which changes may be in the design of the casing that is placed on the upper side of the windshield or in the arrangement of the mechanism therein for transmitting the reciprocating motion to the wiper. Another change may be in the design of the take-off casing or in the type of clutch used, as it is understood any suitable clutch may be used to connect the gear to the shaft. And still another change may be in the location of the take-off or clutch casing, or in the means for connecting it to one of the moving parts of a motor vehicle or the like.

The construction will readily be understood from the foregoing description. To use the device it may be placed on a motor vehicle as shown in Figure 1 and it will be seen that as the lever 25 is placed in the position shown in Figure 4 the device will move a wiper on the windshield backward and forward as the speedometer cable rotates. When it is not desired to use the wiper the handle 25 may be raised to the position shown in dotted lines in Figure 4 and placed over the lug 32 in the opening through which the lever projects so that the device may be held in the free position. It will be seen that as the worm 5 rotates one end of the arm 7 will follow a circle indicated by the line 35, which motion will move the opposite end from one to the other of the positions shown in dotted lines in Figure 2. It will also be seen that the travel of the wiper may be increased or decreased by increasing or decreasing the diameter of the circle 35 or the length of the arm 9.

Having thus fully described the invention, what I claim as new and desire to secure by Letters Patent, is:—

In power take off for motor vehicle windshield wipers, a casing that may be inserted between the speedometer and the end of the speedometer cable, an extension with suitable sockets at both ends that may be placed between the speedometer and the cable, another shaft that may be placed in the casing, a means for rotating the latter shaft from the extension of the speedometer cable, a clutch on the latter shaft, a lever projecting through the casing for operating the clutch and a means for connecting said latter shaft to a flexible cable that may be attached to the windshield wiper.

LESLIE A. WILSON.